United States Patent
Park et al.

(10) Patent No.: US 9,002,512 B2
(45) Date of Patent: Apr. 7, 2015

(54) ROBOT AND METHOD OF CONTROLLING WALKING THEREOF

(75) Inventors: Jae Ho Park, Suwon-si (KR); Kyung Shik Roh, Seongnam-si (KR); Woong Kwon, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 775 days.

(21) Appl. No.: 12/382,244

(22) Filed: Mar. 11, 2009

(65) Prior Publication Data

US 2009/0306821 A1 Dec. 10, 2009

(30) Foreign Application Priority Data

Jun. 4, 2008 (KR) ........................ 10-2008-0052476

(51) Int. Cl.
*G06F 19/00* (2011.01)
*B62D 57/032* (2006.01)
*B25J 13/00* (2006.01)
*B25J 5/00* (2006.01)

(52) U.S. Cl.
CPC ............. *B62D 57/032* (2013.01); *Y10S 901/01* (2013.01)

(58) Field of Classification Search
USPC ................................. 700/245–264
See application file for complete search history.

(56) References Cited

U.S. PATENT DOCUMENTS

| 5,151,895 | A | 9/1992 | Vacon et al. |
| 5,432,417 | A | 7/1995 | Takenaka et al. |
| 2003/0173926 | A1* | 9/2003 | Hattori et al. ................ 318/567 |
| 2006/0173578 | A1* | 8/2006 | Takenaka et al. ............ 700/245 |
| 2006/0247799 | A1* | 11/2006 | Takenaka et al. ............... 700/54 |
| 2007/0267994 | A1* | 11/2007 | Sugihara ................ 318/568.12 |
| 2008/0133055 | A1* | 6/2008 | Hasegawa ..................... 700/252 |

FOREIGN PATENT DOCUMENTS

EP    1844907  A1 * 10/2007
WO  WO 2006/040868      4/2006

OTHER PUBLICATIONS

Korean Office Action dated Apr. 8, 2014 from Korean Patent Application No. 10-2008-0052476, 11 pages.

\* cited by examiner

*Primary Examiner* — Khoi Tran
*Assistant Examiner* — Dale Moyer
(74) *Attorney, Agent, or Firm* — Harness, Dickey & Pierce, P.L.C.

(57) ABSTRACT

Disclosed are a robot, which generates a stable walking pattern similar to that of a human, and a method of controlling walking thereof. The method includes generating a walking pattern of a leg connected to a torso of the robot; detecting whether or not a singularity pose of the leg walking according to the walking pattern is generated; and changing the walking pattern by adjusting a yaw direction angle of the torso when the singularity pose is generated.

13 Claims, 8 Drawing Sheets

ROBOT AND METHOD OF CONTROLLING WALKING THEREOF

CROSS-REFERENCE TO RELATED APPLICATIONS

This application claims the benefit of Korean Patent Application No. 2008-0052476, filed Jun. 4, 2008, in the Korean Intellectual Property Office, the disclosure of which is incorporated herein by reference.

BACKGROUND

1. Field

The present invention relates to a robot and a method of controlling walking thereof, and more particularly to a biped robot, which generates a stable walking pattern similar to that of a human while walking, and a method of controlling walking of the robot.

2. Description of the Related Art

In general, machines, which conduct motions similar to that of a human using an electric or magnetic action, are referred to as robots. Early robots were industrial robots, such as manipulators or transfer robots for the purpose of work automation and unmanned operation in production sites. Recently, a biped walking robot (hereinafter, referred to as a biped robot), which has a joint system similar that of a human and easily walks with two feet in human work and living spaces, has been researched and developed. U.S. Pat. Nos. 5,151,859 and 5,432,417 disclose examples of the above biped robot.

A walking pattern of a biped robot is generated through the following process. First, when a walking instruction, such as a walking speed, a number of steps, or a step width, is given, target positions and directions of both feet are determined and positions and direction trajectories of both feet according to time are generated based on the determined target positions and directions. Here, a target zero moment point (ZMP; specifying the point with respect to which dynamic reaction force at the contact of the foot with the ground does not produce any moment, i.e. the point where total inertia force equals zero) trajectory is determined also by the positions of both feet. A target ZMP is set such that the robot can stably walk using a principle that the robot does not fall down in case that the ZMP is located in a support polygon formed by one supporting foot or both feet when the robot walks, and a position of a torso of the robot is determined such that the ZMP of the robot is equal to the target ZMP. This position of the torso of the robot is obtained using a simplified robot model, and when the determined position of the torso is applied to a real robot, there is a difference between the target ZMP and the real ZMP. Thus, the walking pattern of the robot is generated by determining the position of the torso of the robot until this ZMP error is smaller than a random value, and positions/directions of both feet and the torso of the robot are controlled according to the walking pattern, thereby allowing the biped robot to walk.

However, the real ZMP differs from the target ZMP due to various differences of characteristics between a robot model and the real robot, and thus causes the walking of the robot to be unstable. The walking stability of the robot is badly influenced by unexpected contact or external force, and if severe, the robot may lose its balance and thus fall down. Therefore, in order to allow the robot to stably walk without falling down, a given walking pattern must be corrected in real time. Here, a real time stabilizer calculates a necessary position value (x, y) of the torso, and thus controls the stabilization of the robot such that the robot cannot fall down.

When a robot 1 walks through the above real time stabilization control, when a singularity pose is generated, it is difficult to achieve real time stabilization control. This singularity pose occurs when a relative distance between ankle joints 2 and hip joints 4 located at both side ends of the lower portion of a torso 3 is equal to the length of legs 5, as shown in FIG. 1. The real time stabilization control is method of changing the horizontal position value of the torso 3 in real time to prevent the robot 1 from falling down while walking. However, when the singularity pose is generated, the horizontal position value of the torso 3 cannot be changed. Conventionally, in order to avoid the singularity pose generating state, the height of the torso 3 is decreased from Zc to Zc−1. However, when the height of the torso 3 is decreased from Zc to Zc−1, the knees 6 must be severely bent, and thus the robot 1 has a walking pattern differing from that of a human, and thus does not accurately represent a human being.

SUMMARY

Accordingly, it is an aspect of the present invention to provide a biped robot, which generates a walking pattern to secure dynamic stability while maintaining the height of a torso similar to that of a human while walking, and a method of controlling walking of the robot.

Additional aspects and/or advantages will be set forth in part in the description which follows and, in part, will be apparent from the description, or may be learned by practice of the invention.

The foregoing and/or other aspects of the present invention are achieved by providing a method of controlling walking of a robot including generating a walking pattern of a leg connected to a torso of the robot; detecting whether or not a singularity pose of the leg walking according to the walking pattern is generated; and changing the walking pattern by adjusting a yaw direction angle of the torso when detected that the singularity pose is generated.

The generating the walking pattern includes generating trajectories of two feet of the robot and a target ZMP trajectory, the generating the trajectories of the feet and the target ZMP trajectory including determining target positions and directions of the feet according to an input walking instruction, and generating a trajectory of the torso based on the generated trajectories of the feet and the target ZMP trajectory.

The method may further include changing a horizontal position value of the torso in real time to obtain the walking stability of the robot if a real ZMP of the robot differs from the target ZMP while the robot walks according to the walking pattern.

The changing the walking pattern includes changing to another walking pattern to avoid the singularity pose including rotating the torso to the yaw direction angle.

The changing the walking pattern includes using the horizontal position value of the torso and the yaw direction angle of the torso.

The horizontal position of the torso may be equal to the initial walking pattern even when the walking pattern is changed.

The singularity pose may be a point where a relative distance connecting an ankle joint of the leg and a hip joint located at a lower portion of the torso is equal to a length of the leg.

The robot includes a plurality of the legs connected to the torso.

The foregoing and/or other aspects of the present invention are achieved by providing a robot including, a leg, a torso connected to the leg and a walking pattern generating unit to generate a walking pattern of the leg; a singularity pose detecting unit to detect whether or not a singularity pose of the leg walking according to the walking pattern is generated; a torso position adjusting unit to adjust a yaw direction angle of the torso when the singularity pose is generated; and a control unit to change the walking pattern to avoid the detected singularity pose using the yaw direction angle of the torso and to control the walking of the leg according to the changed walking pattern.

The robot includes a plurality of feet and the walking pattern generating unit determines trajectories of the feet and a target ZMP trajectory by determining target positions and directions of the feet according to an input walking instruction, and generate a trajectory of the torso based on the trajectories of the feet and the target ZMP trajectory.

The robot may further includes a real time stabilizer to change a horizontal position value of the torso in real time to obtain a walking stability of the robot when a real ZMP of the robot differs from the target ZMP when the robot walks according to the walking pattern.

The control unit may control the walking of the leg with the changed walking pattern, by rotating the torso to the yaw direction angle.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENT

Figure 1:
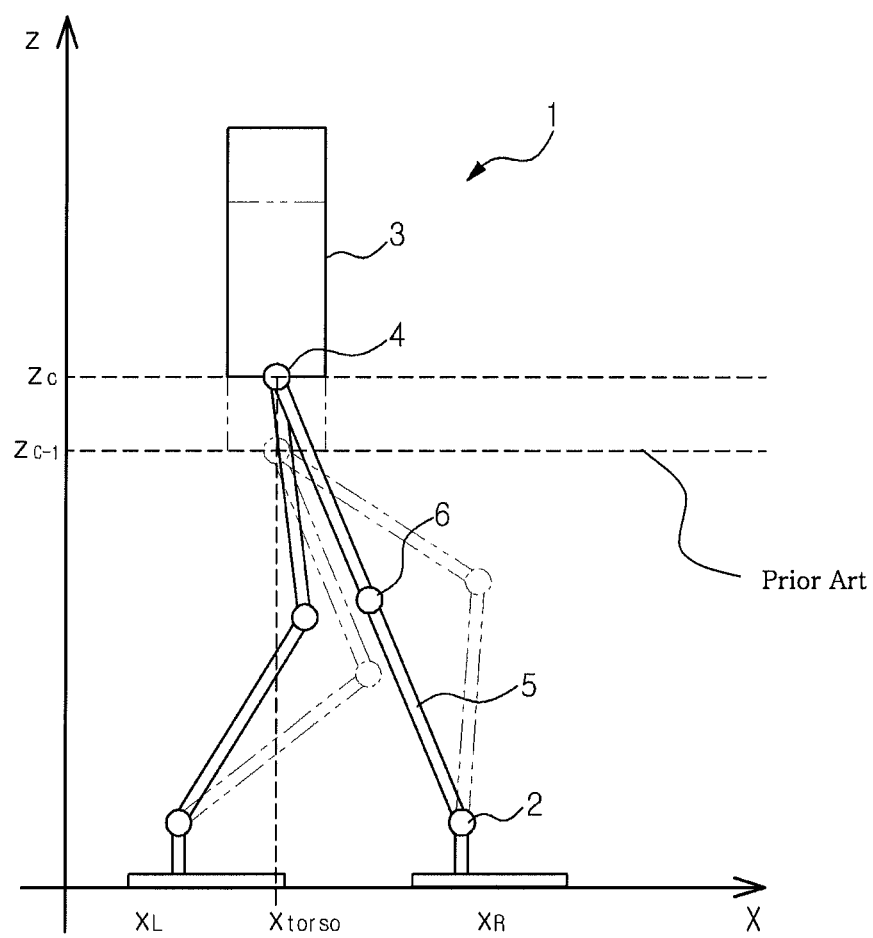
FIG. 1 is a view illustrating a singularity pose generating state of a conventional robot.

Reference will now be made in detail to the embodiment, an example of which is illustrated in the accompanying drawings, wherein like reference numerals refer throughout. The embodiment is described below to explain the present invention by referring to the figures.

Figure 2:
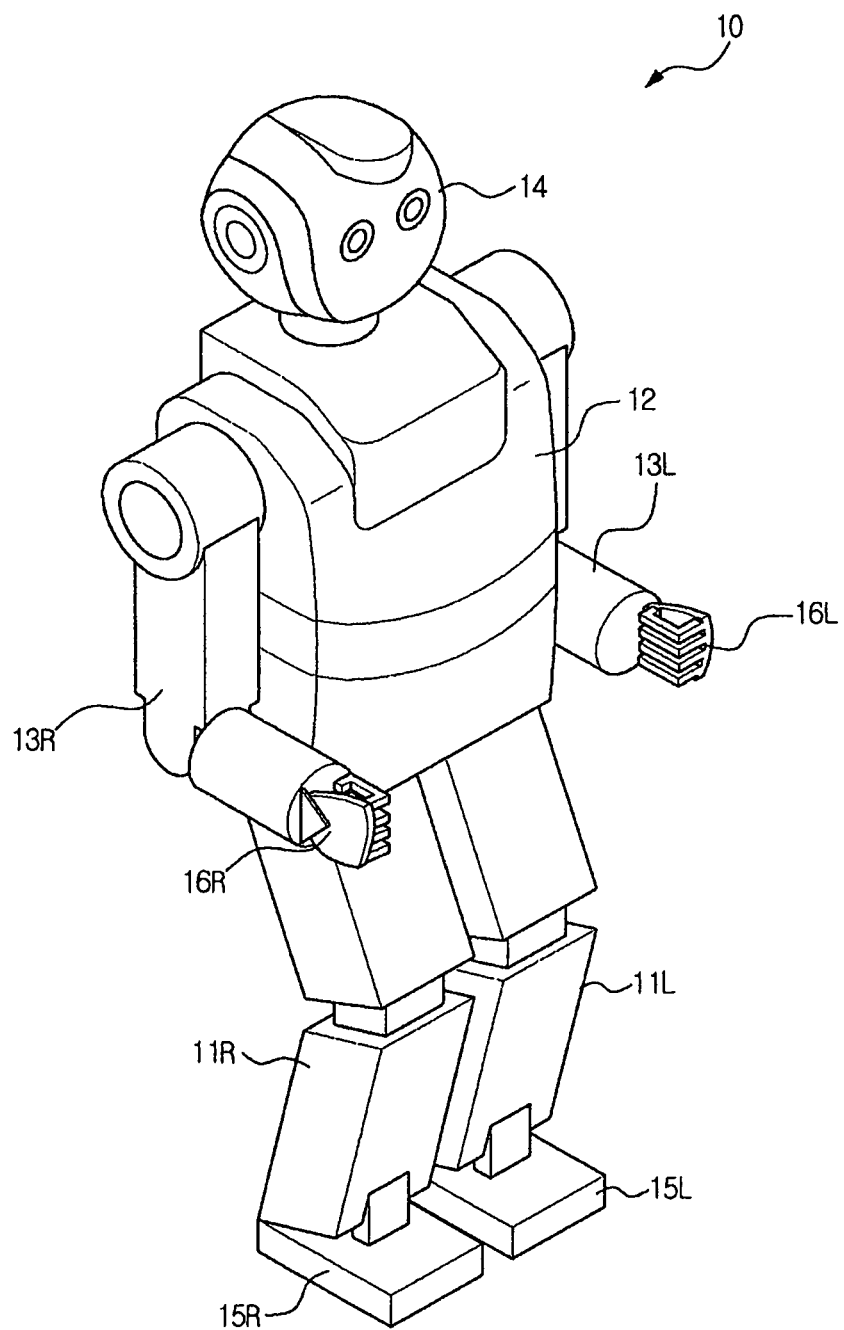
FIG. 2 is a schematic view illustrating the external appearance of a robot in accordance with an embodiment of the present invention.

FIG. 2 is a perspective view illustrating the external appearance of a robot in accordance with an embodiment of the present invention.

In FIG. 2, a robot 10 of the present invention is a biped walking robot, which walks erect using two legs 11R and 11L like a human, and includes a torso 12, two arms 13R and 13L and a head 14 provided at the upper portion of the torso 12, and feet 15R and 15L and hands 16R and 16L respectively provided at front ends of the two legs 11R and 11L and the two arms 13R and 13L.

Figure 3:
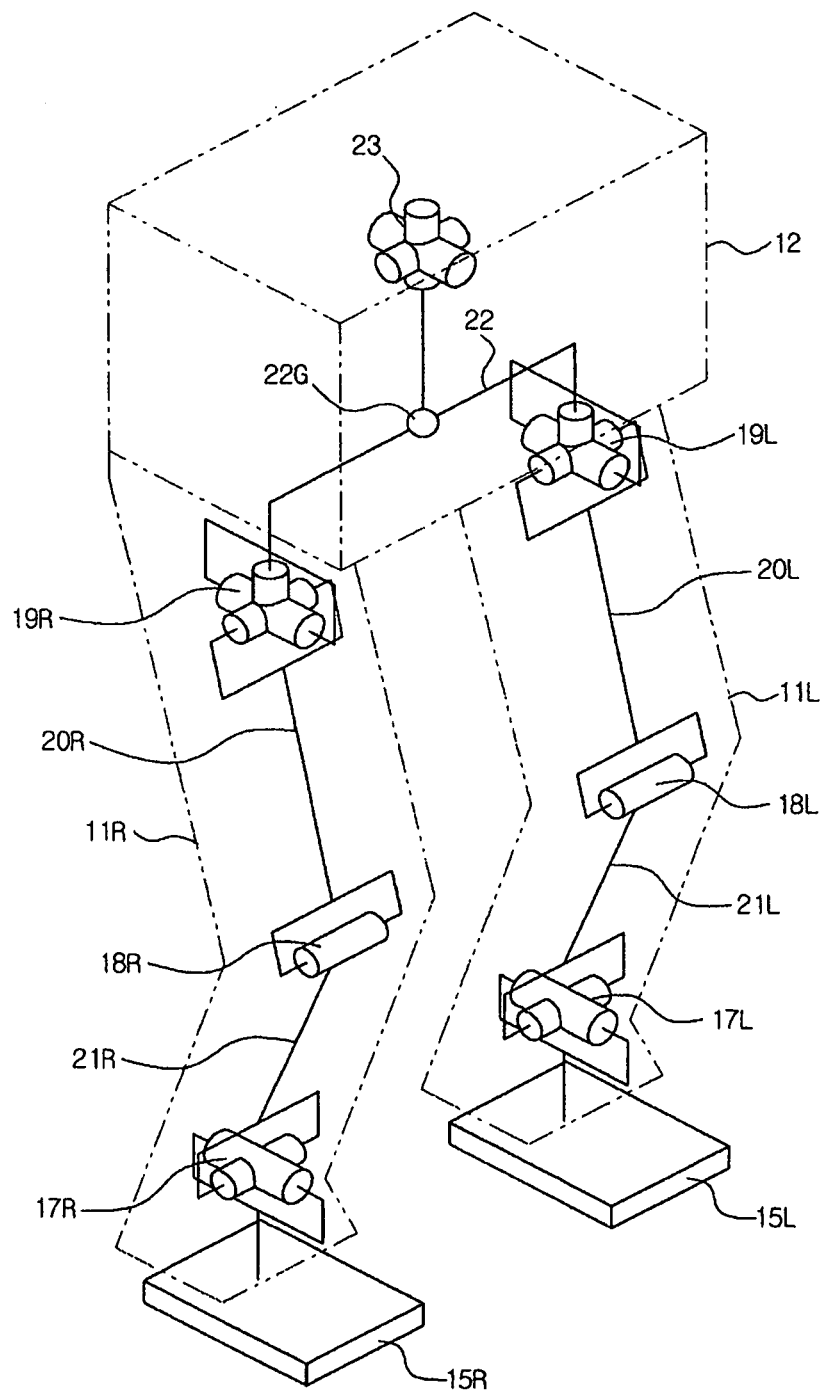
FIG. 3 is a view illustrating principal joint structures of the robot of FIG. 2.

FIG. 3 is a view illustrating principal joint structures of the robot 10 of FIG. 2.

In FIG. 3, the two legs 11R and 11L respectively include ankle joints 17R and 17L, knee joints 18R and 18L, and hip joints 19R and 19L such that portions of the robot 10 corresponding to ankles, knees, and hips can rotate. The hip joints 19R and 19L are located at both side ends of the lower portion of the torso 12 connected to the two legs 11R and 11L.

The ankle joints 17R and 17L of the legs 11R and 11L can move in the directions of the x-axis (in the direction of a roll axis, i.e., the direction of the walking of the robot) and y-axis (in the direction of a pitch axis, i.e., the direction of the step width of the robot), the knee joints 18R and 18L can move in the direction of the y-axis (in the direction of the pitch axis), and the hip joints 19R and 19L can move in the directions of the x-axis, y-axis, and z-axis (in the direction of a yaw axis).

Further, the two legs 11R and 11L respectively include upper links 20R and 20L connecting the hip joints 19R and 19L and the knee joints 18R and 18L, and lower links 21R and 21L connecting the knee joints 18R and 18L and the ankle joints 17R and 17L, such that the robot 10 can walk with a designated level of the degree of freedom according to the movement of the respective joints 17R and 17L, 18R and 18L, and 19R and 19L.

The torso 12 connected with the two legs 11R and 11L includes a waist joint 23 such that a portion of the robot 10 corresponding to a waist can rotate. The waist joint 23 is located coaxially with a central position 22G of a hip link 22 connecting the hip joints 19R and 19L located at both side ends of the lower portion of the torso 12, and can move in the directions of the x-axis, y-axis, and z-axis.

Although not shown in the drawings, each of the joints 17R and 17L, 18R and 18L, 19R and 19L, and 23 of the robot 10 includes an actuator for the operation thereof (for example, an electric driving device, such as a motor).

Figure 4:
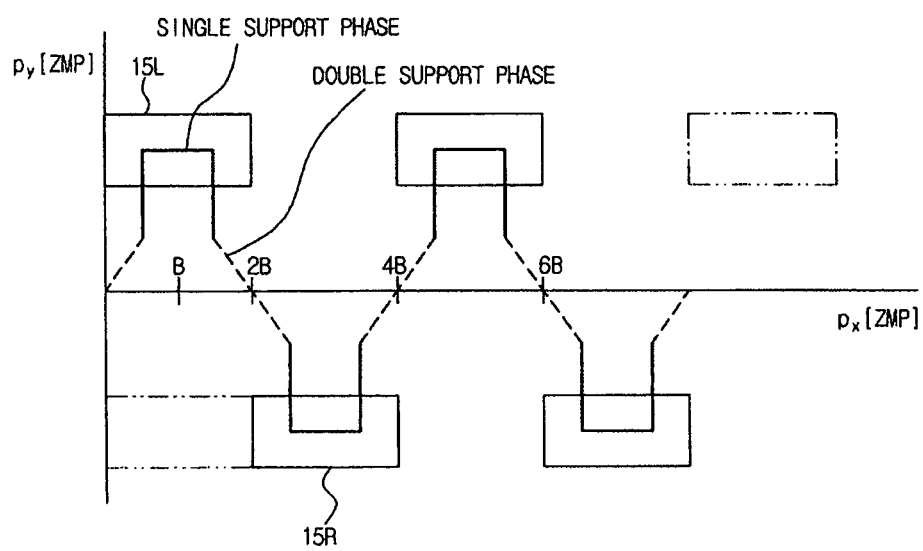
FIG. 4 is a view illustrating a target ZMP trajectory of the robot in accordance with the embodiment of the present invention.

FIG. 4 is a view illustrating a target ZMP trajectory of the robot in accordance with the embodiment of the present invention. That is, FIG. 4 illustrates the target ZMP trajectory of the robot 10 in the directions of the x-axis and the y-axis, which is represented on an x-y plane.

In FIG. 4, B represents a half of the step width.

As shown in FIG. 4, in order to allow the robot 10 to achieve stable walking, a point where the sum total of moments equals zero, i.e., points where both feet make a step, must be predetermined, and the target ZMP trajectory to predetermine support phases, such as a single support phase and a double support phase, must be set.

The points where the feet of the robot 10 make a step are generally expressed by a periodic function, and the support phases are used to move the ZMP. In the single support phase, the ZMP must remain in the sole of the foot of a supporting leg while a swing leg makes a step. In the double support phase, the ZMP must be rapidly moved from the inside of the sole of the foot of the supporting leg to the inside of the sole of the foot of the swing leg. In order to allow the robot 10 to continuously and stably walk, the above process is repeated.

Figure 5:
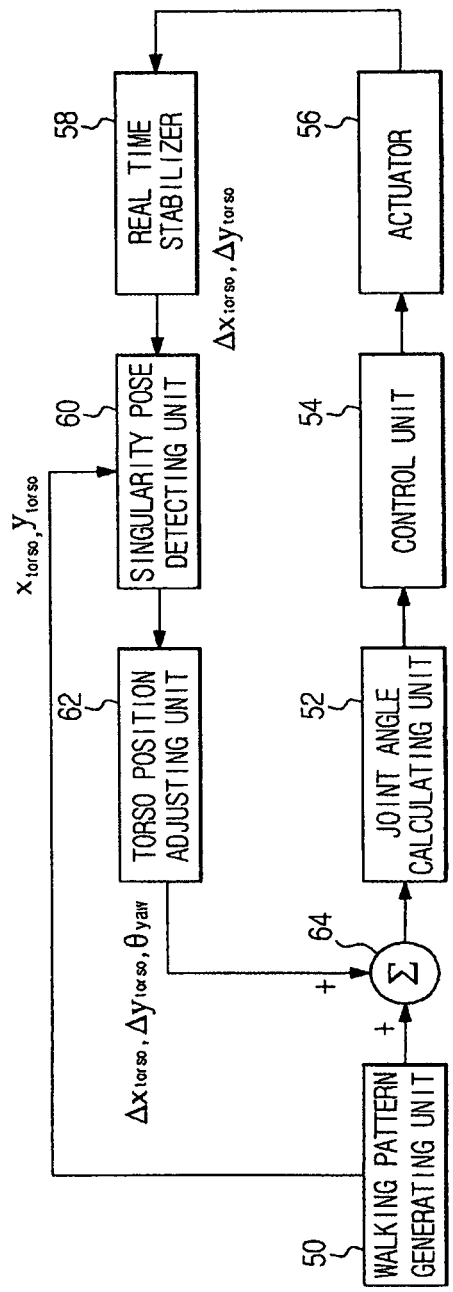
FIG. 5 is a walking control block diagram of the robot in accordance with the embodiment of the present invention.

FIG. 5 is a walking control block diagram of the robot in accordance with the embodiment of the present invention. As shown in FIG. 5, the robot 10 includes a walking pattern generating unit 50, a joint angle calculating unit 52, a control unit 54, an actuator 56, a real time stabilizer 58, a singularity pose detecting unit 60, a torso position adjusting unit 62, and a walking pattern changing unit 64.

The walking pattern generating unit 50 generates a walking pattern according to a given walking instruction, when the walking instruction, such as a target walking speed, a number of steps, or a step width, is given. Here, the walking pattern generating process of the embodiment of the present invention is performed in a similar manner as a conventional walking pattern generating process.

More specifically, when the walking instruction, such as a target walking speed, a number of steps, or a step width, is given, the walking pattern generating unit 50 determines target positions and directions of both feet 15R and 15L, and prepares positions and direction trajectories of both feet 15R and 15L according to time based on the determined target positions and directions. Here, a target ZMP trajectory is determined also by the positions of both feet 15R and 15L. A target ZMP is set such that the robot 10 can stably walk using a principle that the robot 10 does not fall down in case that the ZMP is located in a support polygon formed by one supporting leg 15R or 15L or both feet 15R and 15L when the robot 10 walks, and the position of the torso 12 of the robot 10 is calculated such that the ZMP of the robot 10 is equal to the target ZMP. This position of the torso 12 is obtained using a simplified model of the robot 10, and when the determined position of the torso 12 is applied to a real robot 10, there is a difference between the target ZMP and the real ZMP Thus, walking pattern generating unit 50 generates the walking pattern ($x_{torso}$, $y_{torso}$) by calculating the position of the torso 12 until this ZMP error is smaller than a random value.

The joint angle calculating unit 52 converts the walking pattern ($x_{torso}$, $y_{torso}$), generated by the walking pattern generating unit 50, i.e., the position/direction values of both feet 15R and 15L and the torso 12, into angle values of the respective joints 17R and 17L, 18R and 18L, 19R and 19L, and 23, and transmits the angle values to the control unit 54.

The control unit 54 drives the actuators 56 of the respective joints 17R and 17L, 18R and 18L, 19R and 19L, and 23 using the angle values, calculated by the joint angle calculating unit 52, and controls positions/directions of both feet 15R and 15L and the torso 12 such that the robot 10 can walk according to the given walking pattern ($x_{torso}$, $y_{torso}$).

The real time stabilizer 58 changes the given walking pattern ($x_{torso}$, $y_{torso}$) in real time such that the robot 10 can stably walk without falling down even when the real ZMP of the robot 10 differs from the target ZMP or external disturbance (unexpected contact or external force) occurs during the walking of the robot 10 according to the given walking pattern ($x_{torso}$, $y_{torso}$). The real time stabilizer 58 calculates a variation value ($\Delta x_{torso}$, $\Delta y_{torso}$) of the horizontal position value (x, y) of the torso 12, which is required for the stable walking of the robot 10, and thus controls the stable walking of the robot 10.

The singularity pose detecting unit 60 detects whether or not a singularity pose (for example, the singularity pose of the right foot) is generated due to the variation value ($\Delta x_{torso}$, $\Delta y_{torso}$) of the horizontal position value (x, y) of the torso 12, obtained by the real time stabilizer 58. Here, the case that a relative distance between the ankle joints 17R and 17L and the hip joints 19R and 19L is equal to the length of the legs 11R and 11L is referred to a singularity pose generating state.

The torso position adjusting unit 62 adjusts a yaw direction angle θ of the torso 12 when a singularity pose is generated while the robot 10 walks according to the given walking pattern. When the yaw direction angle θ of the torso 12 is properly adjusted, the generation of a singularity pose cannot be avoided even at the height of the torso 12 where the singularity pose may be generated.

The walking pattern changing unit 64 generates a new walking pattern to avoid the singularity pose generating state or the singularity pose adjacent to the state using the horizontal position value (x, y) of the torso 12, obtained by the real time stabilizer 58, and the yaw direction angle θ of the torso 12, obtained by the torso position adjusting unit 62. Through the new walking pattern, it is possible to achieve the stabilization control of the robot 10 and increase the height of the torso 12 of the robot 10 to a level similar to that of a human.

Hereinafter, the singularity pose generating state will be described in more detail with reference to FIGS. 6 and 7.

Figure 6:
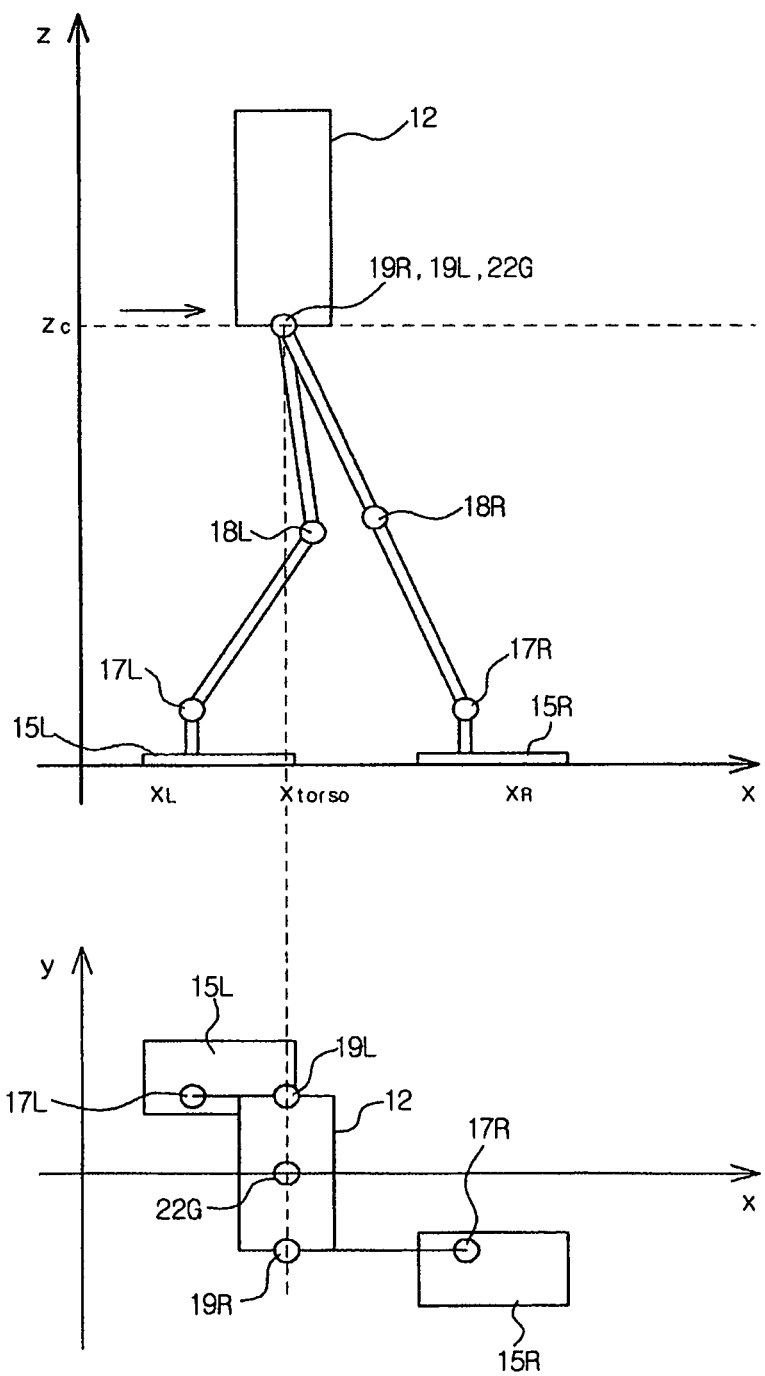
FIG. 6 is a view illustrating a singularity pose generating state of the robot in accordance with the embodiment of the present invention.

FIG. 6 is a view illustrating a singularity pose generating state of the robot in accordance with the embodiment of the present invention, i.e., illustrating the case that the right foot 15R becomes in the singularity pose generating state during the walking of the robot 10 according to the given walking pattern, represented on a z-x plane and an x-y plane.

As shown in FIG. 6, when the right foot 15R is in the singularity pose generating state, the relative distance between the right ankle joint 17R and the right hip joint 19R is equal to the length of the right leg 11R. When the right foot 15R is in the singularity pose generating state, as described above, it is difficult to achieve the real time stabilization control. Therefore, in the embodiment of the present invention, the torso 12 is rotated at a designated angle in the yaw direction, i.e., the yaw direction angle θ, and thus the position of the torso 12 is adjusted.

Figure 7:
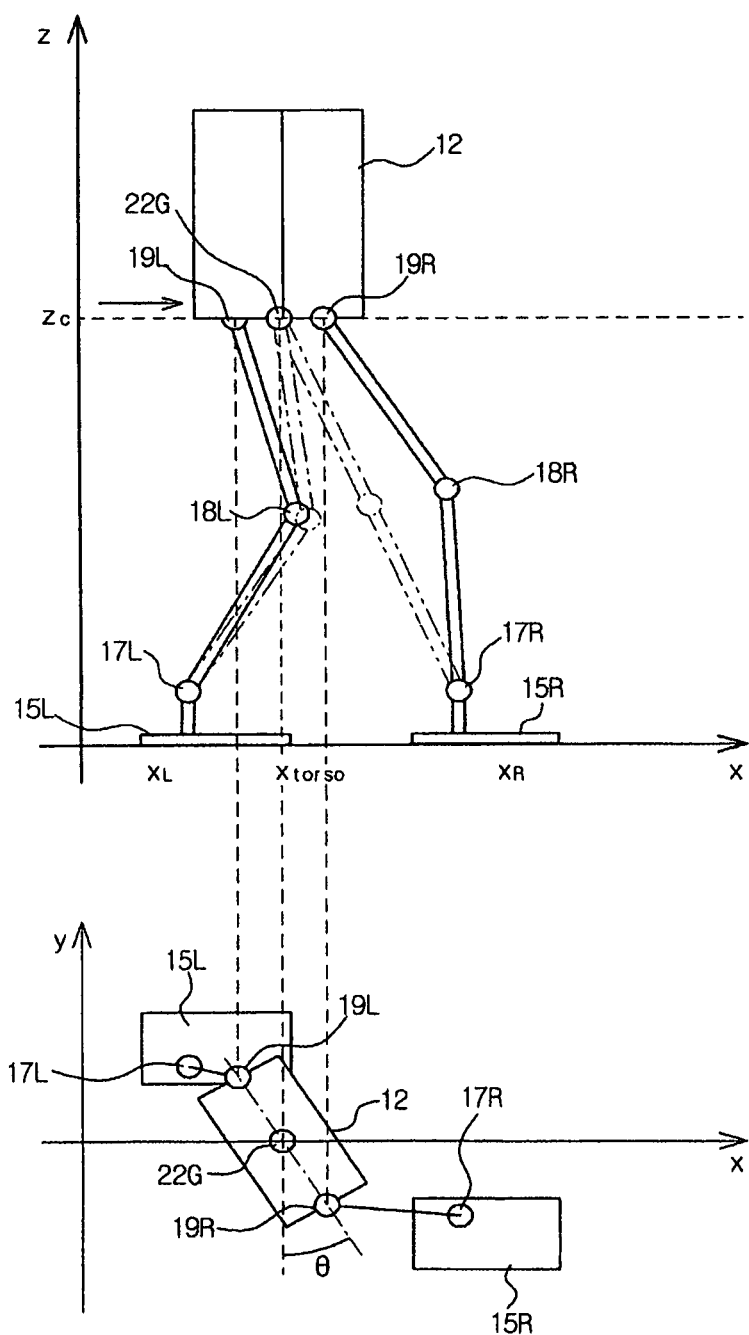
FIG. 7 is a view illustrating the rotating state of a torso to avoid the singularity pose generating state of the robot in accordance with the embodiment of the present invention.

FIG. 7 is a view illustrating the rotating state of the torso 12 to avoid the singularity pose generating state of the robot 10 in accordance with the embodiment of the present invention, i.e., illustrating the case that the torso 12 is rotated at the yaw direction angle θ in the yaw direction when the right foot 15R becomes in the singularity pose generating state during the walking of the robot 10 according to the given walking pattern, represented on a z-x plane and an x-y plane.

As shown in FIG. 7, in case that the right foot 15R becomes in the singularity pose generating state, when the torso 12 is rotated at the yaw direction angle θ in the yaw direction, only the positions of both hip joints 19R and 19L are changed but the central position 22G of the torso 12 is not changed. Thereby, the relative distance between the right ankle joint 17R and the right hip joint 19R is shorter than the length of the right leg 11R, thus a singularity pose is not generated. Then, since it is possible to change the horizontal position of the torso 12 through the real time stabilizer 58, the position of the torso 12 having the height ($Z_c$) similar to that of a human is maintained. The horizontal position of the torso 12 most highly influencing the ZMP is equal to the initial walking pattern, and thus dynamic stability of the robot 10 is only changed slightly.

Hereinafter, a process of calculating the yaw direction angle θ of the torso 12 to avoid the singularity pose generating state will be described with reference to FIG. 8.

Figure 8:
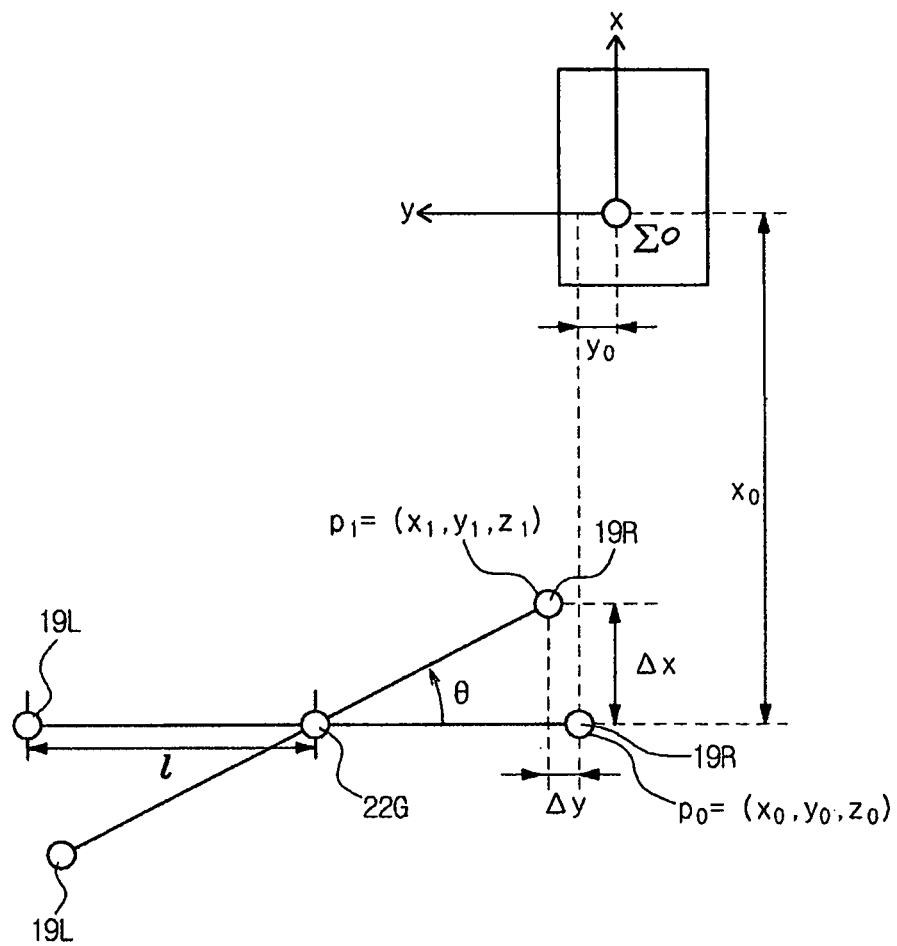
FIG. 8 is a view illustrating a process of calculating a yaw direction angle of the torso of FIG. 7.

FIG. 8 is a view illustrating the process of calculating the yaw direction angle θ of the torso 12 of FIG. 7.

In FIG. 8, the length D of the right leg 11R, where a singularity pose is generated, is the sum of the length L1 of the upper link connecting the right hip joint 19R and the right knee joint 18R and the length L2 of the lower link connecting the right knee joint 18R and the right ankle joint 17R. When the right hip joint 19R is located at the position of $p_0$ (with reference to FIG. 6), the relative distance |$p_0$| between the right hip joint 19R and the right ankle joint 17R is longer than the length D of the right leg 11R. At this time, supposing that the torso 12 is rotated in the yaw direction and the right hip joint 19R is moved from the position of $p_0$ to another position of $p_1$ (with reference to FIG. 7), i.e., only x and y values are changed while maintaining a z value, a yaw direction angle θ to cause the value $|p_1|$ to be equal to the length D of the right leg 11R is obtained by the following expression, and the value $|p_1|$ may be changed arbitrarily. Here, for the convenience in calculation, the right angle joint 17R is set to the origin. The yaw direction angle θ is obtained by the following equation.

$$D = L1 + L2$$

$\Delta x = l \sin\theta, \Delta y = l(1-\cos\theta)$ here, the values of $\Delta x$, $\Delta y$, and θ being larger 0

$x_1 = x_0 + \Delta x, y_1 = y_0 + \Delta y$ here, the value of $x_0$ being larger than 0

$$|p_0|^2 = D_0^2 > D^2, |p_1|^2 = D_1^2 = D^2$$

$$|p_0|^2 - |p_1|^2 = D_0^2 - D^2 = K$$

$$\begin{aligned} K &= (x_0^2 + y_0^2 + z_0^2) - (x_1^2 + y_1^2 + z_1^2) \\ &= (x_0^2 + y_0^2) - ((x_0 + \Delta x)^2 + (y_0 + \Delta y)^2) \\ &= -2x_0\Delta x - 2y_0\Delta y - (\Delta x)^2 - (\Delta y)^2 \\ &= -2x_0 l \sin\theta - 2y_0 l(1-\cos\theta)^2 - l^2\sin^2\theta - l^2(1-\cos\theta)^2 \\ &= -2x_0 l \sin\theta - 2y_0 l(1-\cos\theta) - 2l^2(1-\cos\theta) \\ &= -2x_0 l \sin\theta - 2l(1-\cos\theta)(y_0 + l) \\ &= 2l(|x_0|\sin\theta - (y_0 + l)(1-\cos\theta)) \end{aligned}$$

here, the value of $|x_0| = -x_0$ being larger than 0

$$|x_0|\sin\theta - (y_0 + l)(1 - \cos\theta) = K/2l$$

Thus, when $a \sin\theta + b \cos\theta = c$, $\theta = \sin^{-1}(\alpha) - \beta$.
Here, $a = |x_0|$, $b = y_0 + l$, $c = K/2l + y_0 + l$, $$\alpha = c/(\sqrt{a^2 + b^2}), \beta = \tan^{-1}(b/a)$$

When the yaw direction angle θ is obtained by the above expression, a new walking pattern is generated using the obtained yaw direction angle θ.

Through the new walking pattern, it is possible to achieve the stabilization control of the robot 10 and increase the height of the torso 12 of the robot 10 to a level similar to that of a human. Further, since the horizontal position (x, y) of the torso 12 most greatly influencing the ZMP is equal to the given walking pattern, the dynamic stability of the robot 10 does not change so much and thus the robot 10 can have a walking pattern maximally similar to that of a human.

As apparent from the above description, the embodiment of the present invention provides a biped robot and a method of controlling walking of the robot, in which a torso of the robot is maintained to a height similar to that of a human and a walking pattern to secure the dynamic stability of the robot is generated while the robot walks, such that the walking pattern of the robot is maximally similar to that of a human, thus enhancing a similarity to a human being and increasing energy efficiency. Thereby, the spread of the biped robot is promoted in a robot and human coexistence environment.

Although an embodiment of the invention has been shown and described, it would be appreciated by those skilled in the art that changes may be made in this embodiments without departing from the principles and spirit of the invention, the scope of which is defined in the claims and their equivalents.

What is claimed is:

1. A method of controlling walking of a robot comprising:
   generating a walking pattern of a leg connected to a torso of the robot;
   detecting whether or not a singularity pose of the leg walking according to the walking pattern is generated, the singularity pose being a point in which a relative distance connecting an ankle joint of the leg and a hip joint located at a lower portion of the torso is equal to a length of the leg; and
   changing the walking pattern by adjusting a yaw direction angle of the torso when the generated singularity pose is detected,
   wherein the adjusted yaw direction angle is obtained using a position of the leg when the singularity pose is generated.

2. The method according to claim 1, wherein the generating the walking pattern comprises generating trajectories of two feet of the robot and a target ZMP trajectory, the generating the trajectories of the fuel and the target ZMP trajectory comprising determining target positions and directions of the feet according to an input walking instruction, and generating a trajectory of the torso based on the generated trajectories of the feet and the target ZMP trajectory.

3. The method according to claim 2, further comprising changing a horizontal position value of the torso in real time to obtain the walking stability of the robot if a real ZMP of the robot differs from the target ZMP while the robot walks according to the walking pattern.

4. The method according to claim 3, wherein the changing the walking pattern comprises changing to another walking pattern to avoid the singularity pose comprising rotating the torso to the yaw direction angle.

5. The method according to claim 4, wherein the changing the walking pattern comprises using the horizontal position value of the torso and the yaw direction angle of the torso.

6. The method according to claim 5, wherein the horizontal position of the torso is equal to the initial walking pattern even when the walking pattern is changed.

7. The method according to claim 1, wherein the robot comprises a plurality of the legs connected to the torso.

8. A robot comprising:
   a leg;
   a torso connected to the leg;
   a walking pattern generating unit to generate a walking pattern of the leg;
   a singularity pose detecting unit to detect whether or not a singularity pose of the leg walking according to the walking pattern is generated, the singularity pose being a point in which a relative distance connecting an ankle joint of the leg and a hip joint located at a lower portion of the torso is equal to a length of the leg;
   a torso position adjusting unit to adjust a yaw direction angle of the torso when the generated singularity pose is detected; and
   a control unit to change the walking pattern to avoid the detected singularity pose using the yaw direction angle of the torso and to control the walking of the leg according to the changed walking pattern,
   wherein the adjusted yaw direction angle is obtained using a position of the leg when the singularity pose is generated.

9. The robot according to claim 8, wherein the robot comprises a plurality of feet and the walking pattern generating unit determines trajectories of the feet and a target ZMP trajectory by determining target positions and directions of the feet according to an input walking instruction, and generates a trajectory of the torso based on the trajectories of the feet and the target ZMP trajectory.

10. The robot according to claim 9, further comprising a real time stabilizer to change a horizontal position value of the torso in real time to obtain a walking stability of the robot when a real ZMP of the robot differs from the target ZMP when the robot walks according to the walking pattern.

11. The robot according to claim 8, wherein the control unit controls the walking of the leg with the changed walking pattern, by rotating the torso to the yaw direction angle.

12. The robot according to claim 11, wherein the horizontal position of the torso is equal to the initial walking pattern even when the walking pattern is changed.

13. A method of controlling walking of a robot, comprising:
- determining an imbalance of the robot;
- detecting a singularity pose generated in response to the determined imbalance, the singularity pose being a point in which a relative distance connecting an ankle joint of a leg of the robot and a hip joint located at a lower portion of a torso of the robot is equal to a length of the leg;
- adjusting a yaw direction angle of a torso of the robot when the generated singularity pose is detected; and
- maintaining a height of the torso while adjusting the yaw direction angle,
- wherein the adjusted yaw direction angle is obtained using a position of the leg when the singularity pose is generated.

* * * * *